United States Patent [19]

Kosaka et al.

[11] Patent Number: 5,231,163
[45] Date of Patent: Jul. 27, 1993

[54] POLYARYLENE SULFIDE FROM AROMATIC COMPOUND HAVING AT LEAST THREE FUNCTIONAL GROUPS

[75] Inventors: Wataru Kosaka; Minoru Senga, both of Ichihara; Norio Ogata, Sodegaura; Tatsuya Housaki, Ichihara, all of Japan

[73] Assignee: Idemitsu Petrochemical Company, Ltd., Tokyo, Japan

[21] Appl. No.: 746,819

[22] Filed: Aug. 15, 1991

Related U.S. Application Data

[63] Continuation of Ser. No. 387,904, Aug. 1, 1989, abandoned.

[30] Foreign Application Priority Data

Aug. 5, 1988 [JP] Japan .................. 63-195845
May 8, 1989 [JP] Japan .................. 1-114675

[51] Int. Cl.$^5$ .............................................. C08G 75/16
[52] U.S. Cl. .................... 528/388; 528/210; 528/212; 528/214; 528/271
[58] Field of Search .............. 528/388, 212, 214, 210, 528/271

[56] References Cited

U.S. PATENT DOCUMENTS

| | | | |
|---|---|---|---|
| 4,038,261 | 7/1977 | Crouch | 260/79.1 |
| 4,071,509 | 1/1978 | Edmonds, Jr. | 260/79 |
| 4,116,947 | 9/1978 | Edmonds, Jr. et al. | 528/388 |
| 4,424,339 | 1/1984 | Idel et al. | 528/388 |
| 4,433,138 | 2/1984 | Idel et al. | 528/388 |
| 4,663,430 | 5/1987 | Ostlinning et al. | 528/388 |
| 4,810,773 | 3/1989 | Ogata et al. | 528/388 |
| 4,868,275 | 9/1989 | Kato et al. | 528/388 |

FOREIGN PATENT DOCUMENTS

| | | | |
|---|---|---|---|
| 0100551 | 2/1984 | European Pat. Off. | |
| 0215312 | 3/1987 | European Pat. Off. | 528/388 |
| 0302218 | 2/1989 | European Pat. Off. | |
| 59-223753 | 12/1984 | Japan . | |
| 1057621 | 3/1986 | Japan | 528/388 |
| 62-240359 | 10/1987 | Japan . | |
| 1056226 | 1/1967 | United Kingdom . | |
| 8805061 | 7/1988 | World Int. Prop. O. | 528/388 |

OTHER PUBLICATIONS

Organic Chemistry: A Short Course, Fourth edition, Harold Hart and Robert D. Schuetz, pp. 16–17, 1972.
Japanese Industrial Standard, "Testing Methods for Brightness by Hunter of Paper and Pulp, JIS P 8123-1961".

Primary Examiner—Harold D. Anderson
Attorney, Agent, or Firm—Armstrong, Westerman, Hattori, McLeland & Naughton

[57] ABSTRACT

A polyarylene sulfide has an inherent viscosity $[\eta_{inh}]$ of 0.1 to 0.5 dl/g, a weight-average molecular weight of $1 \times 10^4$ to $2 \times 10^5$; a ratio of the inherent viscosity $[\eta_{inh}]$ to a calculated viscosity $[\eta]_{calc}$ ($[\eta_{inh}/[\eta]_{calc}$) of 0.4/1 to 0.8/1; and a degree of whiteness of 50 or higher when measured in accordance with whiteness testing procedures (JIS P8123). The polyarylene sulfide is prepared by reaction by contacting at least one member of a metallic sulfide (A) selected from an alkali metal sulfide and an alkali metal hydrosulfide with a dihalogen aromatic compound (B) and an aromatic compound (C) having three or more than three functional groups in a polar solvent in a molar ratio of the dihalogen aromatic compound (B) to the metallic sulfide (A) [(B)/(A)] ranging from 1.035/1 to 1.300/1 and in a molar ratio of the aromatic compound (C) to the dihalogen aromatic compound (B) [(C)/(B)] ranging from 0.003/1 to 0.05/1.

A polyarylene sulfide resin composition contains the polyarylene sulfide having the above properties and and at least one member of a filler selected from a fiber filler and a powdery or granular filler.

The polyarylene sulfide resin composition has the mechanical strength, heat resistance, long-term stability, and chemical resistance superior to the polyarylene sulfide.

3 Claims, 6 Drawing Sheets

POLYARYLENE SULFIDE FROM AROMATIC COMPOUND HAVING AT LEAST THREE FUNCTIONAL GROUPS

This application is a continuation of application Ser. No. 387,904 filed Aug. 1, 1989, now abandoned.

BACKGROUND OF THE INVENTION

1. Field of the Invention

The present invention relates to a polyarylene sulfide, a process for preparing the polyarylene sulfide and a resin composition containing the polyarylene sulfide.

The polyarylene sulfide is high in non-Newtonian behavior and high-degree of branching, not too high in an average molecular weight despite the high degree of branching, and a broad molecular weight distribution. The polyarylene sulfide further exhibits excellent moldability, flowability and thermal stability, is so colorless that it has a high degree of whiteness, and very small molding flash (burr) in injection molding. Furthermore, it is readily prepared as a stable resin in its characteristic properties by controlling its polymerization system. The polyarylene sulfide thus prepared can provide a resin composition with improved properties including mechanical strength, thermal resistance, long-term stability and chemical resistance.

2. Description of Related Art

Polyarylene sulfides such as polyphenylene sulfide re resins which are thermoplastic yet partially thermosetting, and they are generally excellent in resistance to heat and chemicals and in dimensional stability so that they lend themselves to molding materials as engineering plastics, for example, for electric and electronic parts, injection-molded articles for precision parts, films, and so on.

It is known that polyarylene sulfides prepared by conventional processes are of a thermally cross-linked type and of a linear high-molecular-weight type.

The polyarylene sulfides of the thermally cross-linked type present various disadvantages. A dark color is imparted to the polyarylene sulfide as well as ultra-high-molecular-weight component results as a polymer powder is heated in the presence of oxygen in order to render a molecular weight of the polyarylene sulfide higher. The polyarylene sulfide is dark brown in color so that the degree of whiteness is very low. As well, it is very brittle because of foaming due to thermal decomposition, an excessive degree of branching and cross-linking, and non-uniformity. The resin cannot be used singly, and a color matching is difficult due to its dark color. For these reasons, the use of the polyarylene sulfide is limited to a relatively narrow field.

The polyarylene sulfides of the linear high-molecular-weight type are superior in terms of the mechanical strength, and particularly properties associated with toughness, compared to those of the thermally cross-linked type, however, they are slow in crystallization as well as low in melt elasticity(melt tension). The polyarylene sulfides of this type are further poor in productivity because molding flash are likely to occur upon injection molding.

In order to solve the problems associated with the thermally cross-linked type and with the linear high-molecular-weight type in a complementary manner, it is necessary to attain an appropriate branching and cross-linking degree, as well as to optimize a molecular weight and a distribution of molecular weights.

It is known as a means for enlarging a molecular weight that the water content in the reaction mixture to be used for polymerization is adjusted by subjecting a hydrous alkali metal sulfide to dehydration prior to polymerization. However, it is to be noted that this procedure does not sufficiently enlarge the molecular weight of a resulting polymer. Thus, for example, U.S. Pat. No. 4,038,261 discloses a process in which a branching agent is added to enlarge the molecular weight of the resulting polymer. This process can produce a polyarylene sulfide such as polyphenylene sulfide having a sufficiently enlarged molecular weight with a relatively readiness, yet its melt flowability is reduced due to polymerization. It is thus to be considered to raise the melt flowability by elevating a molding temperature, however, an elevated molding temperature may cause a decomposition of the polymer so that a injection pressure upon injection molding should be elevated. As a result, molding flash are likely to occur on molded articles and items.

Japanese Patent Publication (laid-open) No. 223,753/1984 discloses a composition obtainable by blending a polyarylene sulfide of a linear high-molecular-weight type with a polyarylene sulfide of a thermally cross-linked type. This composition poses the problems that it is poor in thermal stability and low in a degree of whiteness.

Furthermore, Japanese Patent Publication (laid-open) No. 240,359/1987 discloses a composition consisting of a blend of a linear high-molecular-weight polyarylene sulfide with a linear low-molecular-weight polyarylene sulfide. This composition develops crystallization to a some extent, however, its melt elasticity is rather reduced, incurring the risk of mold flashing upon molding.

Demands have accordingly been made to provide a polyarylene sulfide that attains appropriate branching and cross-linking degrees, optimizes its molecular weight and a distribution of its molecular weights, and furthermore solves the problems encountered with the conventional thermally cross-linked and linear high-molecular-weight polyarylene sulfides.

SUMMARY OF THE INVENTION

Therefore, the present invention has the object to provide a polyarylene sulfide which is high in a non-Newtonian behavior, high melt elasticity(melt tension), and not too high in an average molecular weight in spite of the high degree of branching, as well as broad in a distribution of molecular weight, thereby reducing occurrence of molding flash to a remarkably large extent. The polyarylene sulfide has excellent moldability, fluidity, and thermal stability, and contains a very small amount of impurities, imparting a color to a very low extent and having a high degree of whiteness, thereby permitting a ready color matching.

The present invention has another object to provide a process for preparing a polyarylene sulfide having the properties as have been described hereinabove with ease.

The present invention has a further object to provide a polyarylene sulfide resin composition having further improved mechanical strength, thermal resistance, long-term stability and chemical resistance in addition to the properties inherent in the polyarylene sulfide.

In order to achieve the object, the present invention consists of a polyarylene sulfide having an inherent viscosity $[\eta_{inh}]$ of 0.1 to 0.5 dl/g, a weight-average molecular weight of $1 \times 10^4$ to $2 \times 10^5$, a ratio of the inherent viscosity $[\eta_{inh}]$ to a calculated viscosity $[\eta]_{calc}$ ($[\eta_{inh}]/[\eta]_{calc}$) of 0.4/1 to 0.8/1, and a degree of whiteness of 50 or higher, when measured in accordance with whiteness testing procedures (JIS P8123).

In order to achieve the another object, the present invention consists of a process for preparing a polyarylene sulfide comprising contacting at least one member of a metallic sulfide (A) selected from an alkali metal sulfide and an alkali metal hydrosulfide with a dihalogen aromatic compound (B) and an aromatic compound (C) with three or more than three functional groups, wherein a molar ratio of the dihalogen aromatic compound (B) to the metal sulfide (A), [(B)/(A)], is arranged within the range from 1.035/1 to 1.300/1, and a molar ratio of the aromatic compound (C) to the dihalogen aromatic compound (B), [(C)/(B)], is arranged within the range from 0.003/1 to 0.05/1.

In order to achieve the further object, the present invention consists of a resin composition comprising a polyarylene sulfide having an inherent viscosity $[\eta]_{inh}$ 0.1 to 0.5 dl/g, a weight-average molecular weight of $1 \times 10^4$ to $2 \times 10^5$, a ratio of the inherent viscosity $[_{inh}]$ to a calculated viscosity ($[\eta]_{calc}$ ($[\eta_{inh}]/[\eta]_{calc}$) of 0.4/1 to 0.8/1, and a degree of whiteness of 50 or higher, when measured in accordance with whiteness testing procedures (JIS P8123), and at least one member of a filler selected from a filler in a form of fiber, powder and granule.

DESCRIPTION OF THE PREFERRED EMBODIMENTS

Figure 1:
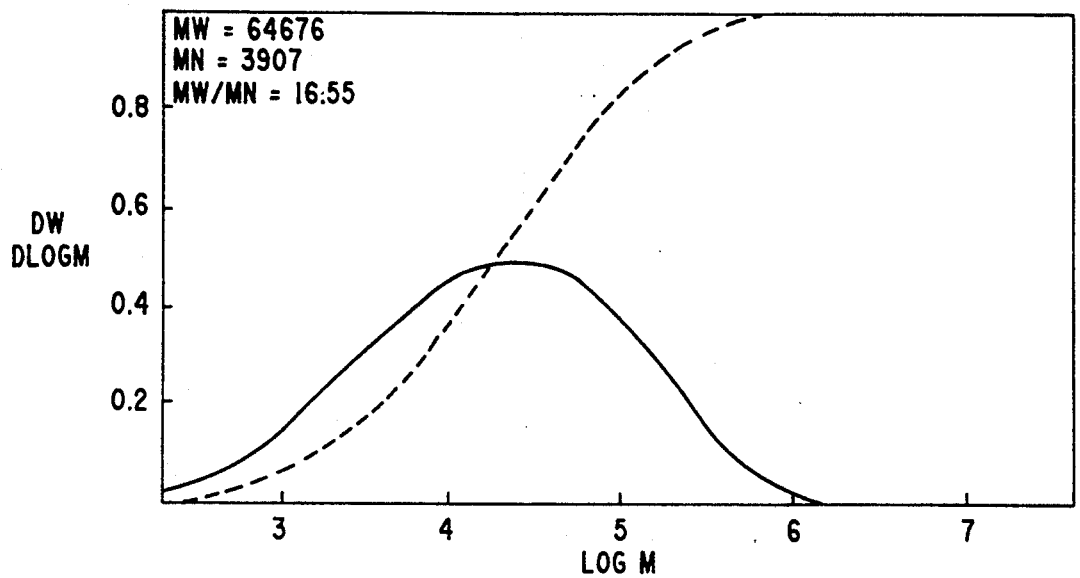
FIG. 1 is a graph showing the gel permeation chromatogram (GPC) indicating a distribution of the molecular weight of a polyphenylene sulfide prepared in Example 1.
Figure 2:
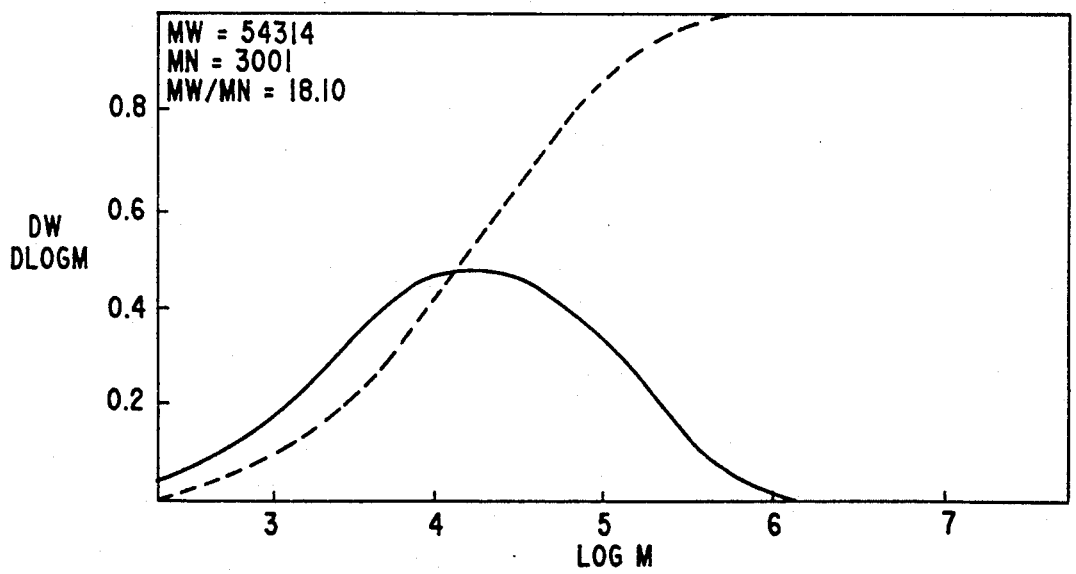
FIG. 2 is a graph showing the gel permeation chromatogram (GPC) indicating a distribution of the molecular weight of a polyphenylene sulfide prepared in Example 5.
Figure 3:
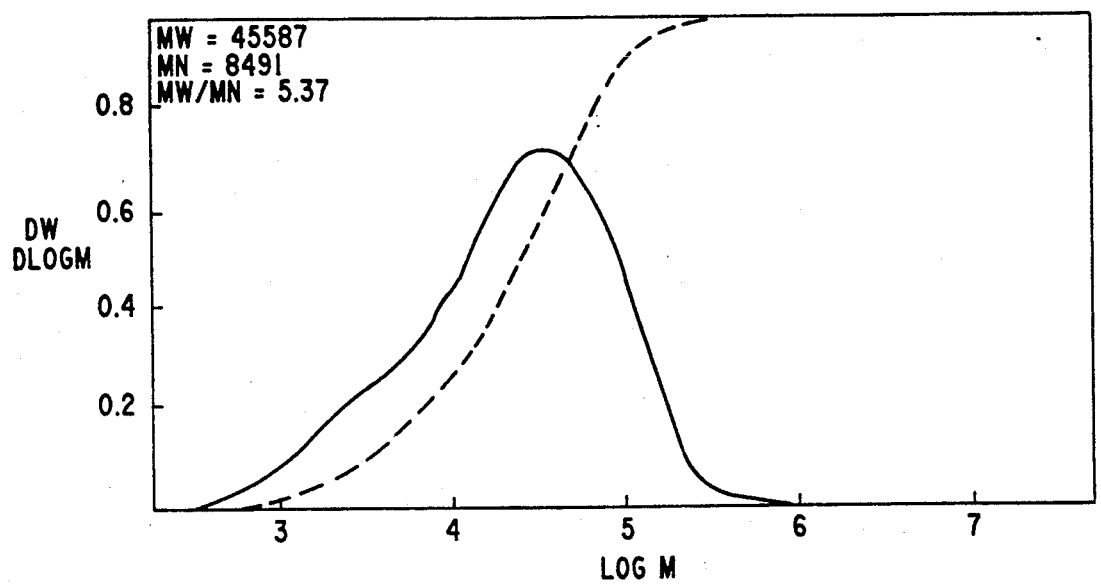
FIG. 3 is a graph showing the gel permeation chromatogram (GPC) indicating a distribution of the molecular weight of a polyphenylene sulfide prepared in Comparative Example 4.
Figure 4:
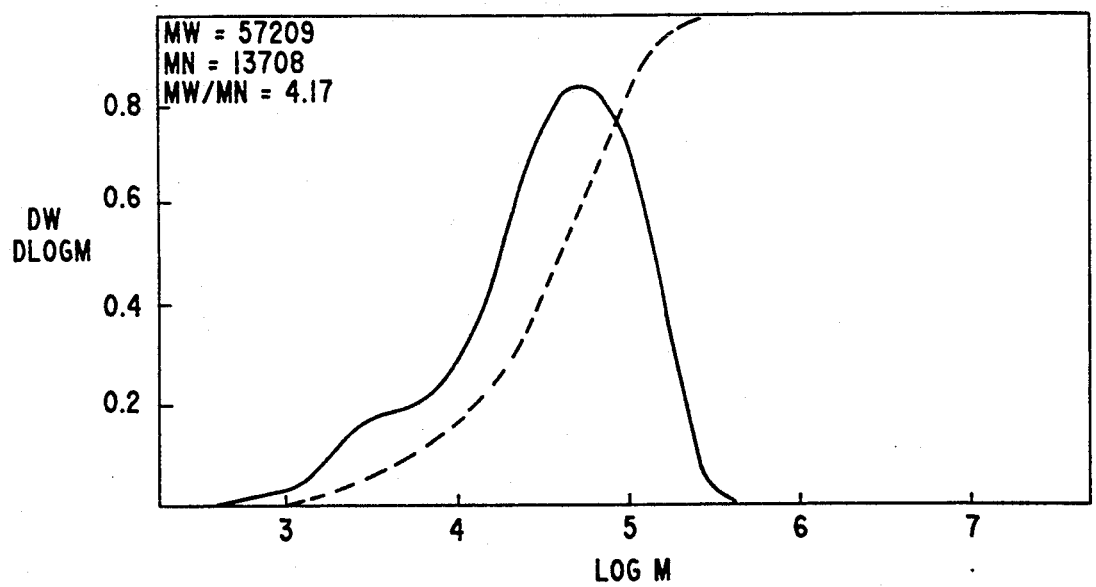
FIG. 4 is a graph showing the gel permeation chromatogram (GPC) indicating a distribution of the molecular weight of a polyphenylene sulfide prepared in Comparative Example 5.

The polyarylene sulfide, the process for preparing the polyarylene sulfide, and the resin composition containing the polyarylene sulfide will be described in detail.

Polyarylene Sulfides

The polyarylene sulfide according to the present invention has an inherent viscosity $[\eta_{inh}]$, a weight-average molecular weight, a ratio of the inherent viscosity $[\eta_{inh}]$ to a calculated viscosity $[\eta]_{calc}$, ($[\eta_{inh}]/[\eta]_{calc}$), and a degree of whiteness within the particular ranges.

The inherent viscosity $[\eta_{inh}]$ is in the range generally from 0.1 to 0.5 dl/g, preferably from 0.2 to 0.4 dl/g. If the inherent viscosity is below the lower limit, the mechanical strength of the polyarylene sulfide is low and its moldability becomes bad because molding flash are likely to occur upon injection molding. If the inherent viscosity exceeds the upper limit, the viscosity at the time of melting becomes too high so that the heating at high temperatures and injection at high pressure is required upon injection molding, thereby decomposing the resin and causing molding flash.

The weight-average molecular weight is in the range generally from $1 \times 10^4$ to $2 \times 10^5$, preferably from $2 \times 10^4$ to $1.5 \times 10^5$, when measured by means of a gel permeation chromatography (GPC). If the weight-average molecular weight becomes below the lower limit, the mechanical strength such as impact strength, long-term stability and chemical resistance are reduced remarkably. If the weight-average molecular weight exceeds the upper limit, the viscosity becomes too high so that the moldability of the polyarylene sulfide becomes so poor to give molded products with favorable properties.

The ratio of the inherent viscosity $[\eta_{inh}]$ to the calculated viscosity $[\eta]_{calc}$ (degree of branching parameter (BI): $[\eta_{inh}]/[\eta]_{calc}$) is in the range of 0.4/1 to 0.8/1, preferably from 0.5/1 to 0.8/1. If the ratio of the inherent viscosity to the calculated viscosity is below the lower limit, the degree of crosslinking becomes too high that the resin becomes too brittle as well as the viscosity becomes too high, thus making the moldability poor. Furthermore, the polyarylene sulfide may gel upon polymerization, thereby making a stable manufacture difficult. If the ratio exceeds the upper limit, the non-Newtonian behavior becomes too small to effectively prevent an occurrence of molding flash upon injection molding.

The weight-average molecular weight may be obtained by means of the gel permeation chromatography (GPC). The calculated viscosity $[\eta]_{calc}$ is $$[\eta]_{calc} = 8.91 \times 10^{-5} \cdot M^{0.747}$$

in a linear or long-chain branched group, or it can be calibrated in a group with a distribution using the following formula:

$$[\eta]_{calc} = \frac{\Sigma\, 8.91 \times 10^{-5} \cdot C_i \cdot M_i^{0.747}}{\Sigma\, C_i}$$

The source : Journal of Applied Polymer Science Vol.32, 3959~3968(1986)
where Ci is a concentration of a component having a molecular weight Mi).

The degree of whiteness is in the range generally from 50 or higher, preferably from 60 or higher, when measured in accordance with whiteness testing procedures (JIS P8123).

Brightness of paper or pulp for paper making is measured by Hunter's brightness apparatus. The brightness of paper or pulp as mentioned herein shall be the ratio of the reflectance of those papers or pulps when illuminated with light in the blue and violet portions of the spectrum to that of a standard magnesium oxide surface. This value has an intimate correlation to the brightness of a white or nearly white paper and pulp and also is applicable to the bleached pulp and the paper made therefrom.

Figure 5:
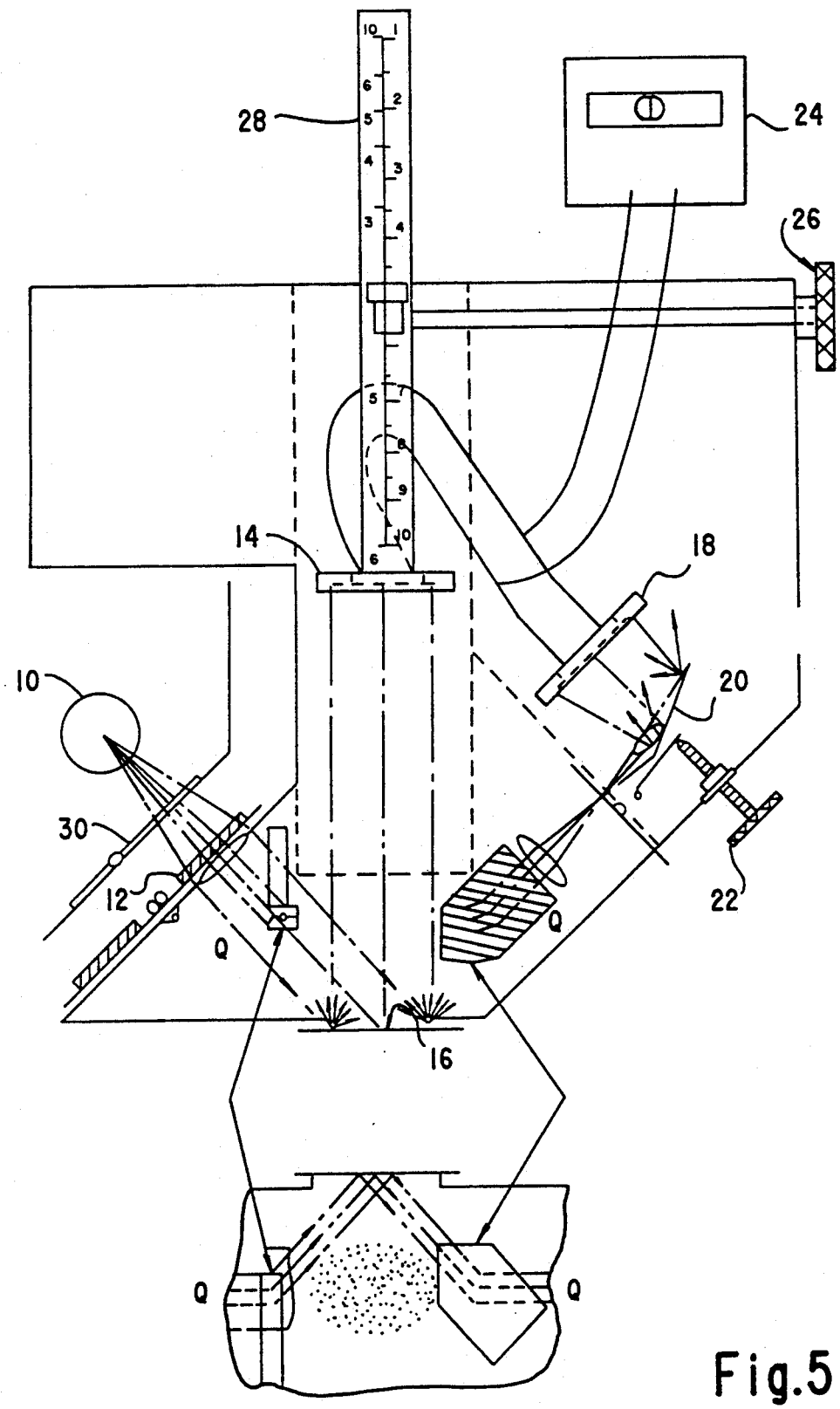
FIG. 5 depicts a Hunter's brightness apparatus for testing the whiteness of a polyarylene sulfide sample.

The Hunter's brightness apparatus includes a reflection meter consisting of a light source 10, a filter 12 and a photoelectric cell 14, as shown in FIG. 5 and its spectral, geometrical and photometrical characteristics are as follows.

Figure 6:
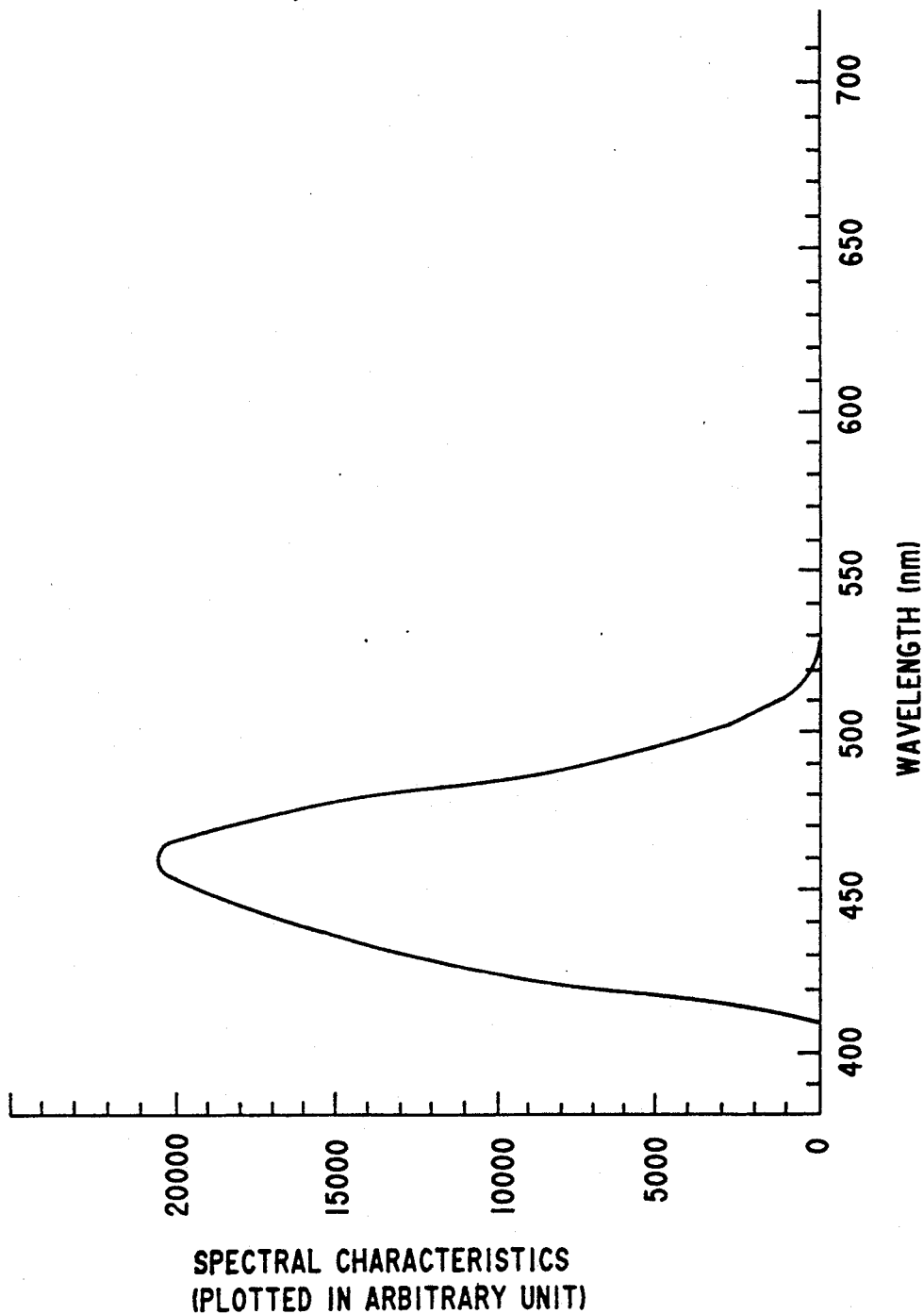
FIG. 6 depicts the spectral characteristics of a photoelectric cell used in the Hunter's brightness apparatus.

If the instrument has the characteristics of the light source 10, blue filter 12 and photoelectric cell 14 as follows, the spectral characteristic curve represented by the mathematical product of spectral energy of the light source, spectral transmittance of the filter and spectral sensitivity of the cell is as shown in FIG. 6. The effective wavelength of the instrument when used with the above definition is 457.0±0.5 nm.

Figure 7:
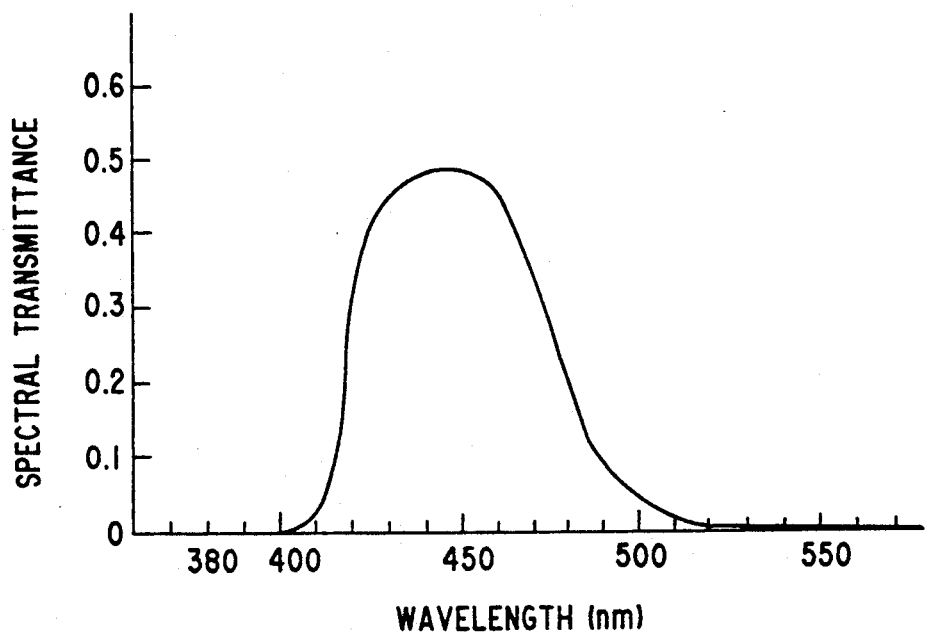
FIG. 7 depicts the spectral transmittance wavelength curve for a blue filter used in the Hunter's brightness apparatus..
Figure 8:
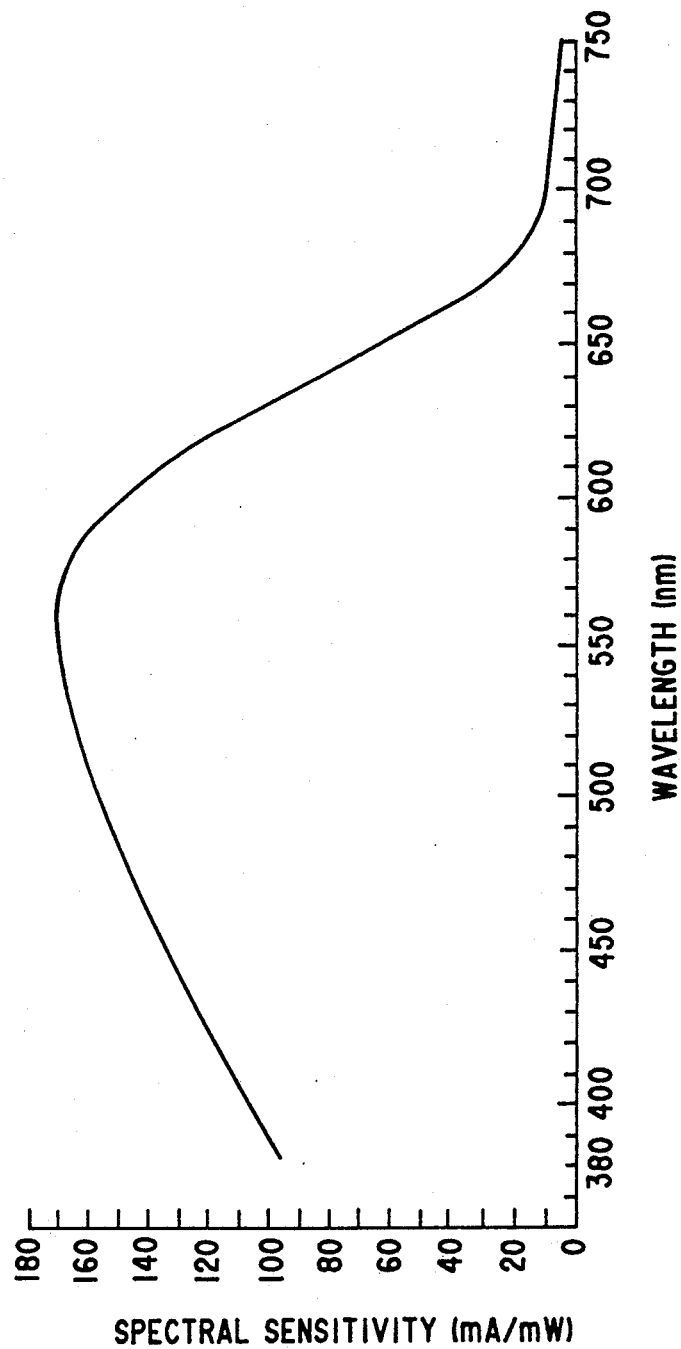
FIG. 8 depicts the spectral sensitivity wavelength curve of the photocell used in the Hunter's brightness apparatus.

The light source is a concentrated filament type lamp operated at a colour temperature of 3100° K. A blue filter 12 exhibiting a spectral transmittance curve as shown in FIG. 7 is a photoelectric cell 14 exhibiting a spectral sensitivity curve as shown in FIG. 8 is used.

The rays from the light source 10, is condensed to parallel beams through a lens and the mean angle of the radiation incident upon the test specimen shall be 45±1°. Thus, the means angle of radiation reflected by the test specimen impinging on the photoelectric cell 14 is between 0° and 1° with respect to the normal to the plane of the sample aperture.

A null photometric method is employed. The reference light is taken from the center portion of parallel rays before they reach to the specimen surface 16 and impinge on the photoelectric cell 18, regulating the angle of the semidiffusing mirror 20 with a screw 22. The light incident upon a point of the specimen is confined within a cone having an angle of approximately 22° which is formed with the condensing lens and the circular aperture of 25 mm diameter.

The galvanometer 24 used has sufficient sensitivity to produce a current of $0.005\mu A$ for single millimeter deflection and is equipped with a regulating switch 26.

The reflectance dial 28 used shall be graduated to sufficient accuracy that the total area of opening of the sector diaphragm is directly proportional to the dial reading to within 0.1% of the full opening. The photoelectric cell 14, which accepts the reflected light, is connected at one end of the reflectance dial 28. When the light intensities reflected from the brightness standard and the specimen surface 16 just coincide by adjusting the distance between the cell and the specimen surface 16, the dial reading represents brightness of the sample. The reflectance dial 28 shall be provided with a precisely calibrated correction curve.

At least four pads of paper tabs of secondary standards are required. They are white, grey and black tabs which cover the brightness ranging from approximately 40 to 85%. The brightness of each standard shall be accurately calibrated against the ultimate standard magnesium oxide (MgO) whose brightness is taken as 100%. The brightness standard tabs require a tough surface permitting easy cleaning and sufficient durability for the intended purpose and its brightness cannot change over a reasonable period of time.

The calibration and adjustment of the instrument is as follows. When in use, the instrument readings shall be checked at least daily against the assigned value of all the secondary standards specified above. If the instrument is found to be appreciable in error (the largest discrepancies being greater than approximately 0.3%), it should be adjusted so that the readings of the brightness standards agree with the assigned value.

The brightness standards set should be standardized at monthly intervals with a freshly prepared magnesium oxide standard and the values corrected for the instrument employed.

Preparation of a MgO standard of reflectance is as follows. A pure magnesium ribbon is burned at a position of 80 to 100 mm above the surface of a suitable material, such as a freshly split surface of magnesium carbonate block, lusterless aluminum plate or porcelain plate, and the magnesium oxide is deposited thereon in a thickness more than 0.5 mm.

Any obviously inferior surfaces compared to the reflectance of each of the prepared surfaces should be discarded. At least six tabs should be prepared.

At intervals of one to three years, depending upon the conditions of use, the instrument should be disassembled and carefully inspected, tested and adjusted to insure that its geometrical and spectral variables fall within proper limits and that its photometric system is accurate.

Utmost precaution shall be made to protect the instrument from the dust.

To make test specimen, a test sheet shall be cut into the tabs 100×90 mm, taking the machine direction as the long dimension. The number of sheets shall be such that when arranged in a pad, the brightness of the pad is not changed by doubling its thickness. The tabs shall be assembled in a pad, with the sides next to the uppermost cover paper, and the top table shall be marked.

The area of the test specimens should not include any watermarks, large dirt specks, or blemishes, etc., that might influence the accuracy of the test results. The test specimens should be protected from contact by fingers or contaminating agents and from the destructive influences of elevated temperature, light and time.

The sequence of measuring the brightness of a test sample is as follows. First, the dial reading shall be set at the assigned brightness value of the standard and the photoelectric current of cell 18 shall be regulated with the adjusting screw 22 to make identical to the photoelectric current of cell 14.

Then the standard shall be replaced with the test sample sheet and the relative distance between cell 14 and the specimen surface 16 is changed to admit photoelectric current equivalent to that flowing through cell 18.

Next, the shutter is closed, the lamp is turned on, and the current is regulated by use of the regulating screw 26, so that the galvanometer 24 reads zero.

With a suitable clamp, place a brightness standard whose brightness value is very close to that of the test sample on the sample aperture and set the dial reading to the assigned value of the standard. Open the shutter 30 for 10 to 15 minutes to introduce light into the cell and warm it until the temperature has equilibrated. In this case, a green filter, not an amber-colored one, should be used. Then close the shutter 30 and set the dial reading at the assigned brightness value by aid of a blue filter. Reopen the shutter 30 and set the galvanometer reading to zero by use of the regulating screw 26. After the above manipulation is accomplished, the test sample is placed on the sample aperture and the galvanometer is set to zero by moving the dial. The value obtained is the brightness value, which should be read to 0.1 unit. The secondary standard tabs shall be calibrated occasionally for its brightness values against the ultimate MgO standard.

A distribution of the molecular weight of the polyarylene sulfide is such that components having molecular weights of $2\times 10^5$ and higher account generally for 3% by weight or higher, preferably for 4% by weight or higher, with respect to the total weight of the polyarylene sulfide and that components having molecular weights of $2\times 10^3$ and lower account for 20% by weight or lower, preferably for 16% by weight or lower, with respect to all the components. The molecular weight distribution within the appropriate range serves as improvements particularly in moldability, for example, by reducing occurrence of molding flash upon injection molding, whereby the polyarylene sulfides can be formed into sheets and films having a uniform thickness and fibers without end breakages.

It is further preferred that the polyarylene sulfides according to the present invention has a fluidity parameter (EI) of 1.2 or higher, when measured by the following relationship:

$$EI = G'_{obs}/G'_1$$

where $G'_{obs}$ and $G'_1$ each is a storage modulus at an angular velocity $\omega = 1$(rad/second) by means of Sinusoidal Oscillation Method at 300° C. using a cone and plate rheometer, and $G'_1$ is a value of a linear polyarylene sulfide having the same inherent viscosity $[\eta_{inh}]$ as the specimen.

If the fluidity parameter becomes below the lower limit, a melt elasticity becomes too high and occurrence of molding flash cannot be effectively prevented upon injection molding.

Preparation of Polyarylene Sulfide

The polyarylene sulfides according to the present invention having the properties as have been described hereinabove may be prepared by contacting at least one member of the metallic sulfide (A) selected from the alkali metal sulfide and the alkali metal hydrosulfide with the dihalogen aromatic compound (B) and the aromatic compound (C) with three or more than three functional groups, wherein a molar ratio of the dihalogen aromatic compound (B) to the metal sulfide (A), [(B)/(A)], is arranged within the range from 1.035/1 to 1.300/1, and a molar ratio of the aromatic compound (C) to the dihalogen aromatic compound (B), [(C)/(B)], is arranged within the range from 0.003/1 to 0.05/1.

The metallic sulfide (A) is selected from the alkali metal sulfide and the alkali metal hydrosulfide.

The alkali metal sulfide may include, for example, lithium sulfide, sodium sulfide, potassium sulfide, rubidium sulfide and cesium sulfide. Sodium sulfide and lithium sulfide are preferred, and sodium sulfide is more preferred. The alkali metal sulfide may be used singly or in combination thereof.

The alkali metal hydrosulfide may include, for example, lithium hydrosulfide, sodium hydrosulfide, potassium hydrosulfide, rubidium hydrosulfide, calcium hydrosulfide, and cesium hydrosulfide. Sodium hydrosulfide and lithium hydrosulfide are preferred, and sodium hydrosulfide is more preferred. The alkali metal hydrosulfide may be used singly or in combination thereof.

The alkali metal sulfide and hydrosulfide may be in the form of an anhydride as well as commercially available or industrial grade hydrate and an aqueous mixture. It is to be noted, however, that the hydrate and the aqueous mixture may be dehydrated prior to polycondensation because a large quantity of water is contained in the polymerization system if they are used as they are.

When the alkali metal hydrosulfide is employed, it is preferred to use a base. The base may be any acid receptor which can convert the alkali metal hydrosulfide or receive a hydrogen halide producible by condensation of the alkali metal hydrosulfide with the dihalogen aromatic compound and which does not adversely affect the object of the present invention. The base may be of an inorganic type and of an organic type. The inorganic salt may preferably include, for example, an alkali metal hydroxide or the like, such as lithium hydroxide, sodium hydroxide, potassium hydroxide, rubidium hydroxide, and cesium hydroxide. Lithium hydroxide and sodium hydroxide are preferred, and sodium hydroxide is more preferred. The base may be used usually at least in an amount of an equimolar equivalent at the maximum per equivalent (mole) of the alkali metal hydrosulfide The base may be used singly or in combination thereof.

The dihalogen aromatic compound (B) to be used for the process according to the present invention may be any conventional one and may include, for example, a dihalogen compound such as m-dihalobenzene and p-dihalobenzene; an alkyl-substituted dihalobenzene such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene and 1-n-hexyl-2,5-dihalobenzene; a cycloalkyl-substituted dihalobenzene such as 1-cyclohexyl-2,5-dihalobenzene; an arylsubstituted dihalobenzene such as 1-phenyl-2,5-dihalobenzene, 1-benzyl- 2,5-dihalobenzene and 1-p-toluyl-2,5-dihalobenzene; a dihalobiphenyl such as 4,4'-dihalobiphenyl; and a dihalonaphthalene such as 1,4-dihalonaphthalene, 1,6-dihalonaphthalene, and 2,6-dihalonaphthalene. The two halogen atoms in the dihalogen aromatic compounds (B) may be the same or different from each other and may be those replaced, for example, by fluorine, chlorine, bromine or iodine. Dihalobenzenes are preferred, and p-dichlorobenzene and p-dichlorobenzene containing 20 mol% or lower of m-dichlorobenzene are particularly preferred.

As the component (C) to be used for the process according to the present invention is the aromatic compound having three or more than three functional groups, preferably three or four, more preferably three functional groups. The aromatic compound may include, for example, an active hydrogen-containing halogen aromatic compound, a polyhalogen aromatic compound, and a halogen aromatic nitro compound. Preferred is the halogen aromatic nitro compound.

The aromatic moiety of the aromatic compound (C), on the one hand, may include, for example, a benzene, biphenyl, diphenyl ether, diphenyl sulfide, or naphthalene. Benzenes are preferred. On the other hand, the functional groups may include, for example, an active hydrogen containing group such as amino, hydroxyl, mercapto, carboxyl, sulfonyl, sulfino, sulfamoyl, hydrazino and carbamoyl groups, a halogen atom as well as a nitro group. Preferred are the halogen atom, as well as the halogen atom and the amino group or nitro group. The halogen atom may include chlorine atom, fluorine atom, bromine atom and iodine atom. Chlorine is particularly preferred. The functional groups to be connected to the aromatic ring or rings may be the same as or different from each other.

As the active hydrogen-containing halogen aromatic compound is employed a halogen aromatic compound with an active hydrogen-containing group or groups, such as an amino group, mercapto group, hydroxyl group or the like. More specifically, the active hydrogen-containing halogen aromatic compound may include, for example, a dihaloaniline such as 2,6-dichloroaniline, 2,5-dichloroaniline, 2,4-dichloroaniline and 2,3-dichloroaniline, a trihaloaniline such as 2,3,4-trichloroaniline, 2,3,5-trichloroaniline, 2,4,6-trichloroaniline and 3,4,5-trichloroaniline, an amino-containing halogen aromatic compound including a dihaloaminodiphenyl ether such as 2,2'-diamino-4,4'-dichlorodiphenyl ether and 2,4'-diamino-2',4-dichlorodiphenyl ether, and those in which the amino group is replaced by the other functional group such as the thiol group or the hydroxyl group.

There may also be used an active hydrogen-containing halogen aromatic compound such as an amino-containing halogen aromatic compound in which a hydrogen atom or atoms joined to the carbon atom or atoms forming its aromatic ring is or are replaced by another inert group or groups such as a carbohydryl group, i.e., an alkyl group.

Among the active hydrogen-containing halogen aromatic compounds, the active hydrogen-containing dihalogen aromatic compound is preferred. Dichloroaniline is more preferred.

The polyhalogen aromatic compound may include, for example, a trihalobenzene such as 1,2,4-trichlorobenzene and 1,3,5-trichlorobenzene and a trihalonaphthalene such as 1,4,6-trichloronaphthalene. Particularly, 1,2,4-trichlorobenzene and 1,3,5-trichlorobenzene are preferred.

The halogen aromatic nitro compound may include, for example, a mono- or di-halonitrobenzene such as 2,4-dinitrochlorobenzene or 2,5-dichloronitrobenzene, a dihalonitrodiphenyl ether such as 2-nitro-4,4'-dichlorodichlorodiphenyl ether, a dihalonitrodiphenyl sulfone such as 3,3'-dinitro-4,4'-dichlorodiphenyl sulfone, a mono- or di-halonitropyridine such as 2,5-dichloro-3-nitropyridine or 2-chloro-3,5-dinitro-pyridine, or a dihalonitronaphthalene.

The aromatic compound (C) may be used singly or in combination thereof.

The molar ratio of the dihalogen aromatic compound (B) to the metallic sulfide (A) may range generally from 1.035/1 to 1.300/1 (B/A), preferably from 1.04/1 to 1.15/1, and the molar ratio of the aromatic compound (C) having three or more than three functional groups to the dihalogen aromatic compound (B) may range generally from 0.003/1 to 0.05/1 (C/B), preferably from 0.004/1 to 0.02/1. If the molar ratio is beyond the limits, no polyarylene sulfide having a sufficiently high molecular weight can be produced or a melt flowability of the polyarylene sulfide cannot be attained although a sufficiently high molecular weight is achieved, thereby impairing its moldability, particularly at the time of injection molding. If the moldability at the time of injection molding is insufficient, a molding pressure is required to be elevated and molding flash are likely to occur upon injection molding. If the ratio (B/A) is 1.2/1 or higher and the ratio (C/B) is 0.05/1 or higher, it is possible to decrease molding flash from occurring, however, the polymer becomes too brittle and too small in yield to be applicable on an industrial scale. As the case may be, the polymer is apt to be colored so that it cannot achieve the object of the present invention.

The polymerization of the dihalogen aromatic compound (B) and the aromatic compound (C) having three or more than three functional groups may be carried out in the presence of an appropriate amount of water as is conventionally carried out.

As the organic polar solvent to be used may be used an amide compound, a lactam compound, a urea compound, and a cyclic organophosphorus compound. Among the organic polar solvent, the aprotic organic amide compound and lactam compound are conveniently used. The solvent may be used singly or in combination thereof.

The amide compound may include, for example, a formamide such as N,N-dimethylformamide, an acetamide such as N,N-dimethylacetamide, N,N-diethylacetamide and N,N-dipropylacetamide, and an amide such as N,N-dimethylbenzamide, and the like.

The lactam compound may include, for example, a caprolactam such as caprolactam, N-methylcaprolactam, N-ethylcaprolactam, N-n-propylcaprolactam, N-isopropylcaprolactam, N-n-butylcaprolactam, N-isobutylcaprolactam and N-cyclcohexylcaprolactam, a pyrrolidone such as N-methyl-2-pyrrolidone, N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-cyclohexyl-2pyrrolidone, N-methyl-3-methyl-2-pyrrolidone, N-ethyl-3-methyl-2-pyrrolidone and N-methyl-3,4,5-trimethyl-2-pyrrolidone, a piperidone such as N-methyl-2-piperidone, N-ethyl-2-piperidone, N-propyl-2-piperidone, N-isopropyl-2-piperidone, N-methyl-6-methyl-2-piperidone, N-methyl-3-ethyl-2-piperidone, and the like.

As the aprotic organic polar solvent may be used, for example, tetramethyl urea, N,N'-dimethylethylene urea, N,N'-dimethylpropylene urea, 1-methyl-1-oxosulphorane, 1-ethyl-1-oxosulphorane, 1-phenyl-1-oxosulphorane, 1-methyl-1-oxophosphorane, 1-n-propyl-1-oxophosphorane, 1-phenyl-1-oxophosphorane, and the like.

Among the organic polar solvents, the aprotic organic amide compound or lactam may be conveniently used. Preferred are an N-alkyllactam and an N-alkylpyrrolidone. More preferred is N-methylpyrrolidone.

Although an amount of the organic polar solvent to be used for the process according to the present invention may be restricted to no particular range as long as the amount thereof is sufficient enough to proceed with the reaction in a homogeneous manner, the amount thereof is in the range from 0.1 to 10 times the total weight of the components (A), (B) and (C), and any other components to be added as needed. If the amount of the solvent is below the lower limit, the reaction does not proceed to a sufficient extent. If it exceeds the upper limit, a volume efficiency is worsened thereby reducing a productivity.

To the polymerization system may be added, if necessary, a polymerization aid, an end-capping agent such as a monohalogen aromatic compound or a compound containing one active hydrogen, a modifier for adjusting solution properties such as an alkali metal hydroxide, or a reducing agent.

As the polymerization aid may be used any conventional ones, such as an alkali metal halide, an alkali metal carboxylate, an alkali metal carbonate, an alkali metal borate, and the like.

The alkali metal halide may include, for example, a fluoride, chloride, bromide and iodide of an alkali metal such as lithium, sodium, potassium, rubidium, and cesium. More specifically, the alkali metal halide may include, for example, lithium fluoride, sodium fluoride, potassium fluoride, lithium chloride, sodium chloride, potassium chloride, rubidium chloride, cesium chloride, lithium bromide, sodium bromide, cesium bromide, lithium iodide, sodium iodide, potassium iodide, cesium iodide, and the like. Preferred is lithium chloride.

The alkali metal halide may be usually added to the organic polar solvent prior to the dehydration step if the dehydration step is employed.

The alkali metal carboxylate may include, for example, an alkali metal salt, such as lithium, sodium, potassium, and cesium, of a carboxylic acid including a saturated aliphatic carboxylic acid such as formic acid, acetic acid, propionic acid, butyric acid, isobutyric acid, valeric acid, hexanoic acid, octanoic acid, and stearic acid; an aromatic carboxylic acid such as benzoic acid; a saturated aliphatic dicarboxylic acid such as oxalic acid and malonic acid; an aliphatic unsaturated dicarboxylic acid such as fumaric acid; an aromatic dicarboxylic acid such as phthalic acid; and an aliphatic oxy acid such as tartaric acid. More particularly, the alkali metal carboxylates may include, for example, lithium formate, sodium formate, lithium acetate, sodium acetate, potassium acetate, cesium acetate, lithium propionate, sodium propionate, lithium butyrate, sodium butyrate, lithium isobutyrate, sodium isobutyrate, lithium valerate, sodium valerate, lithium hexanoate, sodium hexanoate, lithium octanoate, sodium octanoate, lithium stearate, sodium stearate, lithium benzoate, sodium benzoate, potassium benzoate, lithium oxalate, sodium oxalate, lithium malonate, sodium malonate, lithium fumarate, sodium fumarate, lithium phthalate, sodium phthalate, lithium tartrate, and sodium tartrate. Preferred are lithium acetate, sodium acetate, and lithium benzoate.

The alkali metal carbonate may include, for example, lithium carbonate, sodium carbonate, potassium carbonate, rubidium carbonate and cesium carbonate. Lithium carbonate and sodium carbonate is preferred, and lithium carbonate is more preferred.

The alkali metal borate may include, for example, lithium borate, sodium borate, potassium borate, and cesium borate. Lithium and sodium borates are preferred, and lithium borate is preferred.

The polymerization aid may be used in an amount ranging usually from 0.08 to 2.0 moles, preferably from 0.5 to 1.8 moles, with respect to mole of the metallic sulfide (A). If the amount of the polymerization aid becomes below the lower limit, a polyarylene sulfide with a sufficiently high molecular weight may not be produced. If the amount thereof exceeds the upper limit, the metallic sulfide (A) becomes likely to be decomposed and the polymerization may not proceed smoothly.

It is to be noted herein that, when the polymerization aid is not employed, the ratio of the dihalogen aromatic compound (B) to the metallic sulfide (A), i.e., (B)/(A), is not necessarily restricted to the range from 1.035/1 to 1.300/1 because this range is set for polymerization conditions of preparing the linear low-molecular-weight polyarylene sufides.

As the monohalogen aromatic compound to be added to the polymerization system as needed may be enumerated, for example, chlorobenzene, bromobenzene, α-chlorotoluene, o-chlorotoluene, m-chlorotoluene, p-chlorotoluene, α-bromotoluene, o-bromotoluene, m-bromotoluene, and p-bromotoluene.

The active hydrogen-containing compound may include, for example, a thiophenol, phenol, and aniline. In addition thereto, for example, a compound with three or more than three reactive halogen atoms such as cyanuric chloride may be used as the branching agent or molecular weight modifier. The branching agent or molecular weight modifier may be used singly or in combination thereof.

The reducing agent may include, for example, a hydrazine, metal hydride, alkali metal formate, and sulfur. The metal hydride is preferred, as well as sodium borohydride and calcium hydride are more preferred.

The polyarylene sulfides according to the present invention may be prepared under the following reaction conditions. The metallic sulfide (A), dihalogen aromatic compound (B), the aromatic compound (C), and other components to be added as needed are admixed with each other in amounts within the ranges as have been described hereinabove. The resulting mixture may be then subjected to polymerization in the organic polar solvent at a temperature ranging generally from 180° C. to 330° C., preferably from 220° C. to 300° C. If the reaction temperature is below the lower limit, a reaction velocity becomes too slow to be practically applicable. If the temperature goes above the upper limit, side reactions may occur and the resulting polymer may be degraded causing a coloration or gellation. Although a reaction time may vary with kinds and amounts of the various components, and polymerization aid, it may range generally within 20 hours, preferably from 0.1 to 8 hours.

The polycondensation may be carried out in an ambient atmosphere of an inert gas such as nitrogen, argon or carbon dioxide.

A reaction pressure is not restricted to a particular range and may be generally up to 50 kg/cm$^2$ (absolute pressure) from the self pressure of the polycondensation system such as the solvent. The polycondensation may be a one-stage reaction in which the reaction is carried out at a stationary temperature or a multiple-stage reaction in which the reaction temperature is elevated in a stepwise manner or in a continuously ascending manner.

After completion of the polymerization, the resulting polyarylene sulfide may be isolated by separating it directly from a reactor by a standard method such as filtration or centrifugal separation or by separating it from the reaction mixture after addition of a flocculating agent such as water and/or a dilute acid.

The polymer separated is then washed usually with water, methanol, acetone or the like to remove the alkali metal halide, alkali metal sulfide, polymerization aid, by-products and the like adhering to the polymer. The resulting polymer may be recovered by removing the solvent from the reaction mixture without separation therefrom and by washing the residue in the same manner as above. The solvent recovered may be reused.

On top of the reaction procedures as have been described hereinabove, the polyarylene sulfides according to the present invention may also be prepared, for example, by denaturation with an oxidizing agent in a medium or by blending a branched polymer with a linear polymer prepared by methods other than the above-mentioned procedures.

In whatever procedures they are prepared, the polyarylene sulfides according to the present invention can be prepared with readiness as stable resins merely by controlling the polymerization system.

As have been described hereinabove, the polyarylene sulfides according to the present invention are high in a non-Newtonian behavior, high degree of branching yet not too high in an average molecular weight, and broad in a molecular weight distribution. They also have excellent moldability, flowability, and thermal stability, as well as they are not colored so that they have a high degree of whiteness. The polyarylene sulfides are further advantageous because a degree of molding flash extremely small during injection molding. For these advantageous properties, the polyarylene sulfides may be utilized and processed into various molding materials. If required, a salt content such as sodium chloride in the polymer may be reduced to a lesser extent by means of various desalting treatments, thereby resulting in molding materials suitable for electric and electronic parts, precision articles and items, films, and so on.

Polyarylene Sulfide Resin Composition

The polyarylene sulfide resin composition according to the present invention may comprise the polyarylene sulfide and at least one member of the filler selected from the fiber filler and the powdery or granular filler as have been described hereinabove.

To the polyarylene sulfide may be added components other than the polyarylene sulfide, as needed, in amounts which do not adversely affect the objects of the present invention. The other components may include, for example, a branched polyarylene sulfide, a linear polyarylene sulfide or another polymer, which has properties different from the polyarylene sulfide according to the present invention. When the other components are added, the polyarylene sulfide may be used in an amount of 50% by weight or more, preferably 70% by weight or more.

As the fiber filler or the powdery or granular filler may be conveniently used an inorganic filler.

The inorganic filler may include, for example, a carbonate such as calcium carbonate, magnesium carbonate or dolomite; a sulfate such as calcium sulfate or magnesium sulfate; a sufite such as calcium sulfite; talc; clay; mica; titania, zirconia; ferrite; asbestos; glass fibers; a silicate such as calcium silicate, montmorillonite and bentonite; a metallic powder such as iron, zinc, copper, aluminium and nickel; ceramics such as silicon carbide, silicon nitride and boron nitride; and various whiskers, carbon black, graphite, carbon fibers, metal fibers, thermally resistant organic fibers. Glass fibers, carbon fibers, and a mixture thereof with a powdery filler may be conveniently used. The inorganic filler may be used singly or in combination thereof.

The filler may have an average fiber or particle size ranging generally of 20μm or smaller and an optimum fiber or particle size may be appropriately chosen in accordance with the object of adding the filler.

In the polyarylene sulfide resin composition, the filler may be used in an amount ranging generally from 5 to 500 parts by weight, preferably from 10 to 300 parts by weight, with respect to 100 parts by weight of the polyarylene sulfide. If the amount of the filler is below the lower limit, the effects to be expected by its addition cannot be attained. If the amount of the filler exceeds the upper limit, the resulting composition cannot provide sufficient kneading properties, dispersibility, and mechanical strength.

The resin composition according to the present invention may additionally contain an organic filler such as wood flour, palm shell flour, cork powders, flocks or the like, as needed, in spite of or in combination with the inorganic filler. The polyarylene sulfide resin composition further may contain, for example, a stabilizer or a lubricant.

The polyarylene sulfide resin composition according to the present invention is provided with improved mechanical strength, heat resistance, long-term stability and chemical resistance compared with the polyarylene sulfide of the present invention alone, and it is suitable as molding materials for various moldings such as films and fibers, precision moldings, electric and electronic parts, and so on.

The present invention will be described by way of examples with reference to comparative examples.

EXAMPLES 1-9 & COMPARATIVE EXAMPLES 1-6

A 10-liter autoclave was charged with 1,370 g of sodium sulfide pentahydrate, 345 g of lithium chloride (not used in Example 9), and 4,160 ml of N-methyl-2-pyrrolidone (NMP), and the mixture was heated to 200° C. at a nitrogen atmosphere to remove 1,830 ml of a water-NMP mixture. The residue was cooled to 100° C., and a solution of P-dichlorobenzene (PDCB), dichloronitrobenzene (DCNB), or trichlorobenzene (TCB) in 1,500 ml of NMP was added to reach a molar ratio as indicated in Table 1 below. The mixture was reacted at 260° C. for 3 hours. After the reaction mixture was cooled to room temperature, the resulting solid material was separated and washed with 4,500 ml of purified water and with acetone in order and dried in vacuo over the period of 20 hours while heating at 100° C.

The resulting polyarylene sulfides were evaluated for their inherent viscosity $[\eta_{inh}]$, Q value, molecular weight distribution, calculated viscosity $[\eta]_{calc}$, ratio of the inherent viscosity $[\eta_{inh}]$ to the calculated viscosity $[\eta]_{calc}$ (branching parameter (BI): $([\eta_{inh}]/[\eta]_{calc})$, fluidity parameter (EI), and degree of whiteness. The results are shown in Table 1 below.

The molecular weight distributions of the polyarylene sulfides prepared in Examples 1 and 5 as well as in Comparative Examples 4 and 5 are shown in FIGS. 1 to 4, respectively.

The above evaluations were made in accordance with the following test procedures.

Q Value

Q value is measured using a 1 mφ×10 mm nozzle at 300° C. with the load of 50 kg.

Inherent Viscosity $[\eta_{inh}]$

The inherent viscosity $[\eta_{inh}]$ is measured using α-chloronaphthalene in a concentration of 0.4 g/dl at a temperature of 208° C.

Molecular Weight Distribution

Device: Gel permeation chromatography with a high temperature UV detecter
Solvent: α-chloronaphthalene
(Concentration: 0.2±0.01 (g/dl))
Separating column: AT800P+AT80M/S×2 (Showa Denko K.K.)
Column temperature: 210° C.
Flow rate: 1 ml/minute
Detector: UV detector (detecting wavelength λ=356 nm)

Quantitation of Molecular Weight

The molecular weight is measured and calibrated from the universal calibration curve obtained by measuring a single dispersion polystyrene of a known molecular weight.

Branching Degree Parameter (BI)

The branching parameter (BI) is measured from the ratio of the inherent viscosity to calculated viscosity ($[\eta]_{inh}/[\eta]_{calc}$).

It is thus to be noted that the calculated viscosity $[\eta]_{calc}$ is calculated from GPC as follows:

$$[\eta]_{calc} = 8.91 \times 10^{-5} \cdot M^{0.747}$$

in the linear or long-chain branched group, or $$[\eta]_{calc} = \frac{\Sigma\, 8.91 \times 10^{-5} \cdot C_i \cdot M_i^{0.747}}{\Sigma\, C_i}$$

in the group having a distribution.

Fluidity Parameter (EI)

The fluidity parameter (EI) is calculated from the formula:

$$EI = G'_{obs}/G'_1$$

where $G'_{obs}$ and $G'_1$ are each a storage modulus at an angular velocity $\omega = 1$ (rad/second), which is given by the Sinusoidal Oscillation Method at a temperature of 300° C. using a cone and plate rheometer provided that $G'_1$ is a value of a linear polyarylene sulfide having the same inherent viscosity $[\eta_{inh}]$ as the specimen.

Length of Molding Flash

The polyarylene sulfide was blended in the amount of 40% by weight with glass fibers ("03MA497"; Asahi Fiberglass K.K.). Test pieces (127×12.7×3.18 mm) were prepared from the composition and were injection-molded. Lengths of molding flash were microscopically observed and the results are shown in Table 1 below. It is provided, however, that, in Comparative Example 6, a blend of a non-branched polyphenylene sulfide having a different molecular weight was used to prepare a test piece which was likewise measured for lengths of molding flash upon injection molding.

As will be apparent from Table 1 below, the polyarylene sulfides according to the present invention has a high non-Newtonian behavior and a high degree of branching a not, too high average molecular weight in spite of the high degree of branching and a broad molecular weight distribution. It will be apparent that the mold flashing is controlled to a remarkable extent upon injection molding.

EXAMPLE 10 & COMPARATIVE EXAMPLES 7-10

The polyphenylene sulfide was prepared using the components in the molar ratios as shown in Table 2 below in the same manner as in Example 1 with the exception that, in Example 10, lithium chloride was not employed.

The polyphenylene sulfides were measured for the inherent viscosity $[\eta_{inh}]$, Q value, and length of molding flash. The results are shown in Table 2 below.

As have been described hereinabove, the polyarylene sulfides according to the present invention has the inherent viscosity, weight-average molecular weight, ratio of the inherent viscosity to the calculated viscosity, and whiteness within the ranges as have been defined hereinabove, so that they are high in a non-Newtonian behavior, high degree branching not too high in an average molecular weight yet high degree in the branching, and broad in a molecular weight distribution. They are superior in moldability, fluidity, and thermal stability, and they are not so colored that a degree of whiteness is high. Furthermore, molding flash are unlikely to occur upon injection molding. The polyarylene sulfides according to the present invention are industrially useful due to the various advantages because they can be prepared with ease merely by controlling the polymerization system.

The process according to the present invention presents the advantage that the polyarylene sulfides with the advantageous properties can be prepared with stability.

The polyarylene sulfide resin composition according to the present invention has the mechanical strength, resistance to heat, long-term stability and chemical resistance superior to the polyarylene sulfides according to the present invention.

TABLE 1

| | PDCB/ Na₂S | DCNB/ PDCB | TCB/ PDCB | $\eta_{inh}$ | Q value ($10^{-2}$ ml/s) | M.W. Distribution (Weight-Average M.W.) <2 × 10³ (wt %) | >2 × 10⁵ (wt %) | Average M.W. (×10⁴) |
|---|---|---|---|---|---|---|---|---|
| Ex. 1 | 1.05 | 0.008 | — | 0.24 | 0.13 | 11.4 | 6.7 | 6.4 |
| Ex. 2 | 1.05 | — | 0.008 | 0.25 | 0.09 | 9.8 | 7.2 | 7.5 |
| Ex. 3 | 1.05 | 0.015 | — | 0.28 | 0.06 | 7.0 | 10.0 | 8.0 |
| Ex. 4 | 1.05 | — | 0.015 | 0.27 | 0.07 | 7.2 | 9.5 | 8.8 |
| Ex. 5 | 1.10 | 0.015 | — | 0.21 | 0.41 | 14.7 | 5.8 | 5.4 |
| Ex. 6 | 1.10 | — | 0.015 | 0.22 | 0.36 | 12.5 | 6.2 | 6.5 |
| Ex. 7 | 1.20 | 0.030 | — | 0.21 | 0.43 | 13.5 | 6.0 | 6.0 |
| Ex. 8 | 1.20 | 0.050 | — | 0.23 | 0.44 | 14.8 | 8.5 | 6.6 |
| Ex. 9 | 1.05 | 0.008 | — | 0.20 | 0.49 | 15.7 | 5.3 | 4.4 |
| Com. Ex. 1 | 1.00 | — | — | 0.26 | 0.08 | 9.4 | 0.6 | 4.5 |
| Com. Ex. 2 | 1.05 | — | — | 0.12 | 0.90 | 16.0 | 0.0 | 2.1 |
| Com. Ex. 3 | 1.00 | 0.003 | — | 0.37 | 0.009 | 8.0 | 4.0 | 7.8 |
| Com. Ex. 4 | 1.00 | 0.001 | — | 0.28 | 0.060 | 2.5 | 3.1 | 4.6 |
| Com. Ex. 5 | 1.00 | — | — | 0.33 | 0.017 | 2.5 | 2.5 | 5.7 |
| Com A80% | 1.00 | — | — | 0.26 | 0.15 | 9.4 | 0.6 | 4.5 |
| Ex 6 B20% | 1.05 | — | — | 0.12 | — | 16.0 | 0.0 | 2.1 |

Degree of

TABLE 1-continued

|  | $[\eta]_{calc}$ | BI*[1] | EI*[2] | Whiteness Granular Polymer | Whiteness Molded Product | Length of Molding Flash (μm) |
|---|---|---|---|---|---|---|
| Ex. 1 | 0.35 | 0.68 | 1.25 | 88 | 75 | 160 |
| Ex. 2 | 0.33 | 0.76 | 1.23 | 89 | 76 | 120 |
| Ex. 3 | 0.42 | 0.67 | 1.30 | 88 | 75 | 110 |
| Ex. 4 | 0.44 | 0.61 | 1.43 | 87 | 76 | 110 |
| Ex. 5 | 0.31 | 0.68 | 1.25 | 88 | 77 | 290 |
| Ex. 6 | 0.36 | 0.61 | 1.45 | 87 | 77 | 320 |
| Ex. 7 | 0.32 | 0.65 | 1.35 | 87 | 78 | 90 |
| Ex. 8 | 0.37 | 0.62 | 1.45 | 86 | 79 | 50 |
| Ex. 9 | 0.29 | 0.57 | 1.36 | 87 | 76 | 220 |
| Com. Ex. 1 | 0.26 | 1.0 | 1.0 | 87 | 76 | 940 |
| Com. Ex. 2 | 0.12 | 1.0 | 1.0 | 86 | 78 | — |
| Com. Ex. 3 | 0.44 | 0.85 | 1.1 | 86 | 77 | 700 |
| Com. Ex. 4 | 0.29 | 0.97 | 1.0 | 88 | 77 | 820 |
| Com. Ex. 5 | 0.34 | 0.97 | 1.0 | 89 | 78 | 750 |
| Com A80% Ex 6 B20% | 0.26 0.12 | — | — | 86 | 74 | 850 |

Note:
Molded item obtained from commercially available polyarylene sulfide (thermally cross-linked type: "RYTON R-4"; Phillips Petroleum): Degree of whiteness, 22
*[1]BI: Branching parameter: $[\eta]_{inh}/[\eta]_{calc}$
*[2]EI: Fluidity parameter: $G'_{obs}/G'_1$

TABLE 2

|  | PDCB/Na$_2$S | DCNB/PDCB | $\eta_{inh}$ | Q Value ($10^{-2}$ ml/s) | Length of molding Flash (μm) |
|---|---|---|---|---|---|
| Ex. 10 | 1.050 | 0.008 | 0.20 | 0.49 | 220 |
| Com. Ex. 7 | 1.000 | 0.003 | 0.21 | 0.38 | 750 |
| Com. Ex. 8 | 1.030 | — | 0.20 | 0.43 | 700 |
| Com. Ex. 9 | 1.030 | 0.001 | 0.22 | 0.42 | 650 |
| Com. Ex. 10 | 1.000 | 0.007 | Gelled | Not flowed | — |

What is claimed is:

1. A polyarylene sulfide having:
an inherent viscosity $[\eta_{inh}]$ of 0.1 to 0.5 dl/g, measured in α-chloronaphthalene at a concentration of 0.4 g/dl and a temperature of 208° C.;
a weight-average molecular weight of $1 \times 10^4$ to $2 \times 10^5$;
a ratio of the inherent viscosity $[\eta_{inh}]$ to a calculated viscosity $[\eta]$ of 0.4/1 to 0.8/1, in which the calculated viscosity is measured by gel permeation chromatography, according to the formula:

$$[\eta]_{cal} = (\Sigma 8.91 \times 10^{-5} \, Ci \, Mi^{0.747})/\Sigma Ci,$$

wherein Ci is a concentration of a component having a molecular weight Mi; and
a degree of whiteness of 50 or higher.

2. A polyarylene sulfide as claimed in claim 1, wherein a first portion of the polyarylene sulfide has a molecular weight of at least $2 \times 10^5$, the first portion accounts for at least 3% by weight with respect to the total weight of the polyarylene sulfide; and
a second portion of the polyarylene sulfide has a molecular weight of at most $2 \times 10^5$, the second portion of the polyarylene sulfide accounts for at most 20% by weight respect to the total weight of the polyarylene sulfide.

3. A polyarylene sulfide having:
an inherent viscosity $[\eta_{inh}]$ of 0.2 to 0.4 dl/g, measured α-chloronaphthalene at a concentration of 0.4 g/dl and a temperature of 208° C.
a weight-average molecular weight of $2 \times 10^4$ to $1.5 \times 10^5$;
a ratio of the inherent viscosity $[\eta_{inh}]$ to a calculated viscosity $[\eta]_{cal}$ of 0.5/1 to 0.8/1, in which the calculated viscosity is measured by gel permeation chromatography, according to the formula:

$$[\eta]_{cal} = (\Sigma 8.91 \times 10^{-5} \, Ci \, Mi^{0.747})/\Sigma Ci,$$

wherein Ci is a concentration of a component having a molecular weight Mi; and
a degree of whiteness of 60 or higher.

* * * * *